United States Patent [19]

Schwartz

[11] Patent Number: 4,893,037
[45] Date of Patent: Jan. 9, 1990

[54] MOTOR-DRIVEN CABLE REEL ASSEMBLY
[75] Inventor: Östen Schwartz, Värmdö, Sweden
[73] Assignee: AB Electrolux, Stockholm, Sweden
[21] Appl. No.: 182,893
[22] Filed: Apr. 18, 1988
[30] Foreign Application Priority Data
  Apr. 28, 1987 [SE] Sweden .................. 8701749
[51] Int. Cl.⁴ .............. A47L 9/25; H02G 11/02; H01R 13/60; H02K 7/12
[52] U.S. Cl. .............. 310/68 B; 191/12.2 A; 242/54 R; 320/2
[58] Field of Search .............. 191/12.2 R, 12.2 A, 191/12.4; 310/77; 320/2, 25, 26, 3; 360/74.5, 74.7; 361/31

[56] References Cited
U.S. PATENT DOCUMENTS

| | | | |
|---|---|---|---|
| 2,623,750 | 12/1952 | Masterson | 360/74.7 |
| 3,825,740 | 7/1974 | Friedman et al. | 320/3 |
| 3,845,373 | 10/1974 | Totsu et al. | 361/31 |
| 4,085,345 | 4/1978 | Bullat | 310/68 B |
| 4,105,934 | 8/1978 | Jenkins | 318/7 |
| 4,138,177 | 2/1979 | van Valer | 191/12.4 |
| 4,147,906 | 4/1979 | Levine | 200/61.2 |
| 4,320,317 | 3/1982 | Bowey | 310/68 B |

FOREIGN PATENT DOCUMENTS
  44490 7/1981 European Pat. Off. .

Primary Examiner—Patrick R. Salce
Assistant Examiner—D. L. Rebsch
Attorney, Agent, or Firm—Wenderoth, Lind & Ponack

[57] ABSTRACT

A motor-driven electric cable reel assembly includes a rotatable cable take-up drum, and an electric motor for driving the drum in a cable take-up direction. The cable reel assembly also includes a storage battery provided with a battery charger which is connected to the cable in a manner such that the battery is recharged when the cable is connected to an electric power source. Also provided is a switch arrangement which stops the motor in response to torque generated by the motor.

6 Claims, 2 Drawing Sheets

MOTOR-DRIVEN CABLE REEL ASSEMBLY

BACKGROUND OF THE INVENTION

The present invention relates to a cable reel assembly for electric cables, and particularly, but not exclusively, for reeling up the electric cable of a vacuum cleaner, the cable reel assembly comprising a rotatable drum onto which the electric cable is reeled, an electric motor which is operative for driving the drum in the cable reel-in direction, and a storage battery having a battery charging unit which is connected to the cable in a manner such as to recharge the battery when the cable is connected to a current power source.

In known cable reel assemblies the energy required to reel-in the cable is obtained by means of a spring which is tensioned as the cable is drawn off the drum. These known cable reel assemblies have two serious drawbacks, namely that the cable moves sluggishly when reeled off from the drum, and that some form of braking must be provided, in order to hold in check the speed at which the cable is reeled onto the drum.

Withdrawal of the cable can be made smoother and the cable reel-up speed can be maintained at an essentially constant level, by replacing the spring with an electric motor. The energy required thereof can be taken from a battery, or storage battery (accumulator). In this latter case the battery is recharged, e.g., with the aid of a battery charger which, in the case of a vacuum cleaner, is embodied in the vacuum cleaner itself and which replenishes the battery when the electric cable is plugged into the mains. The aforesaid two drawbacks associated with known spring-biassed cable reel assemblies are not found with motor driven reel assemblies. Furthermore, the use of motor-driven reel assemblies enables much longer cables to be reeled up.

For the purpose of reducing the force required to draw cable from the drum of such cable reel assemblies, it is proposed in the published European Patent Publication Serial No. 0 044 490 that the cable reel assembly is disconnected from the reel drive when drawing cable from the drum, and that an electric motor is used for reeling in cable onto the drum, or that the cable drum is driven by an electric motor, either directly or indirectly, both when reeling off cable from the drum and when reeling cable thereonto.

The advantages afforded by a battery-driven cable reel assembly is that a longer cable can be accommodated, that the cable can be drawn out more easily, since no spring need be tensioned, and that the cable is reeled onto the drum more slowly and more smoothly than would otherwise be the case, therewith reducing wear on the cable and consequently eliminating, for instance, the risk of impact from the cable.

SUMMARY OF THE INVENTION

The object of the present invention is to provide a cable reel assembly of the kind set forth in the introduction, in which cable reel-in is controlled in response to the tension force required to reel in the cable.

The inventive cable reel assembly is characterized in that the cable reel assembly further comprises a motor-control switch arrangement which is intended to switch-off the motor in response to torque generated thereby.

BRIEF DESCRIPTION OF THE DRAWINGS

The inventive cable reel assembly will now be described in more detail with reference to the accompanying schematic drawings which illustrate an embodiment of the inventive cable reel assembly and in which.

DETAILED DESCRIPTION OF THE INVENTION

Figure 1:
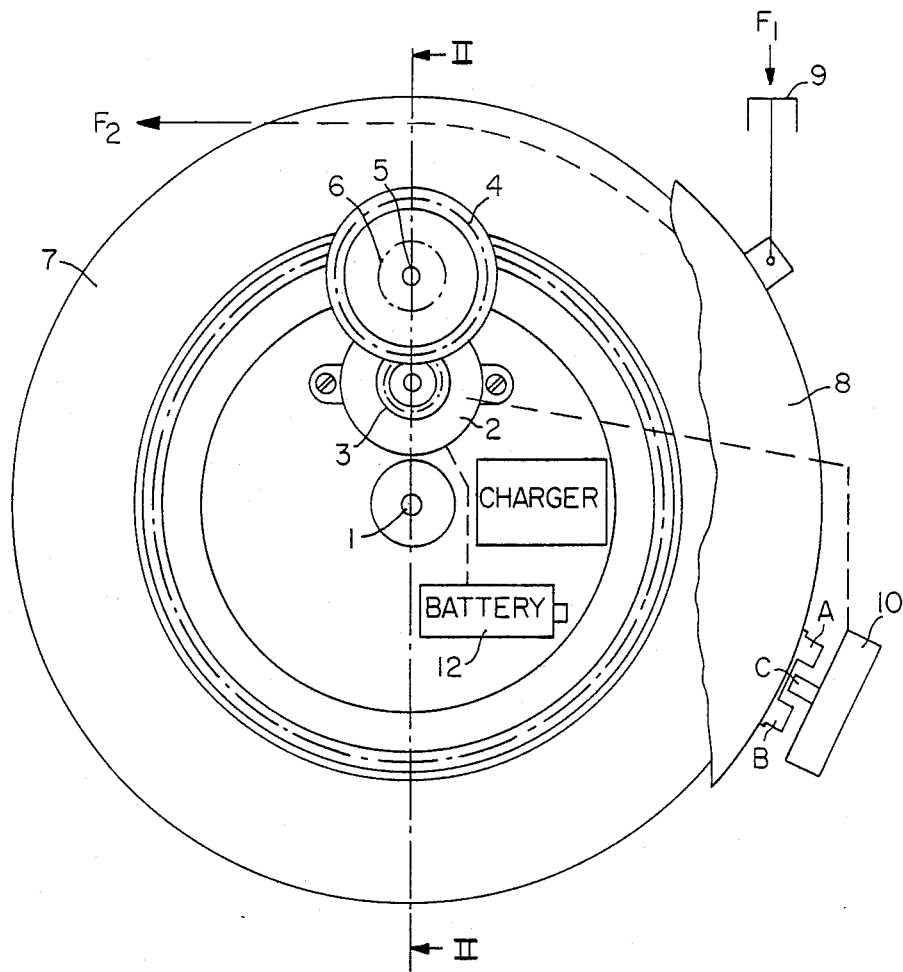
FIG. 1 is an end view of the cable reel assembly.
Figure 2:
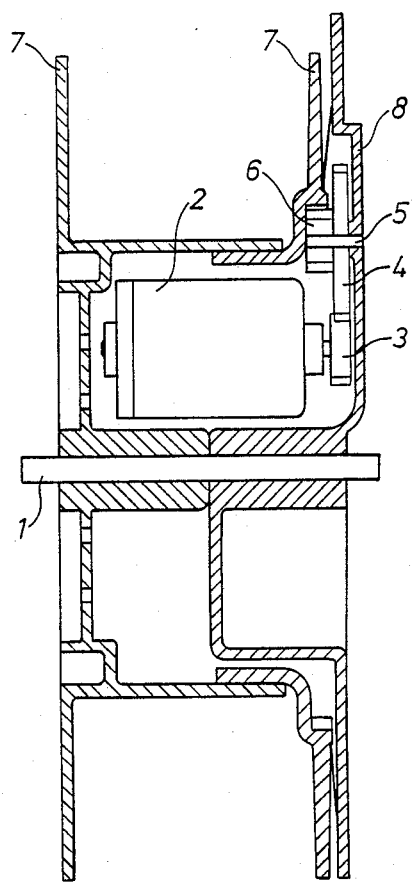
FIG. 2 is an axial sectional view of the cable reel of FIG. 1 taken on the line II—II.

The illustrated cable reel assembly is mounted for rotation about is center axis 1 and is driven by an electric motor 2 over a gear wheel 3 which is located on the motor shaft and which meshes with a gear wheel 4 which is firmly attached to a shaft 5. The shaft 5 also carries a gear wheel 6 which drives a rotatable drum 7 forming part of the cable reel assembly. The shaft 5 is journalled in the side cover wall 8 of the reel.

As shown schematically in FIG. 1, the cable reel assembly is fitted with a manually operated, depressible actuator 9 which controls current supply to the motor 2 from a battery 12, which may be a storage battery. The side wall 8 is journalled on the shaft 1 for limited rotational movement between two spaced stops A and B each of which coacts switchingly with a contact C provided on an electric switch 10. When the actuator 9, which may be a foot-operated pedal, is depressed with a force $F_1$, the side wall 8 is rotated to a terminal position in which the stop A engages the switch contact C, therewith activating the switch 10 so that the current is supplied to the motor 2 and the cable is reeled in, onto the drum 7. The resistance exerted by the cable as it is reeled onto the drum is designated $F_2$ in FIG. 1 and generates a reaction force which is transmitted from the drum to the rotatable side wall 8, over the gears 4, 6. When this reactance force exceeds a given value, e.g. either because the cable is connected to a wall socket, because all of the cable has been reeled in, or because further rotation of the drum 7 is impeded by some obstacle or another, rotation of the side wall 8 will be reversed, such as to bring the stop B into engagement with the switch contact C, and thereby disconnect the current supply to the motor 2. This switching torque is determined by the inertia of the contact C on the switch 10.

Although the motor 2 of the cable reel assembly is normally started by means of the manually operated switch-actuator 9, it will be understood that the cable reel assembly may be constructed to reel-in cable automatically when the tension $F_2$ in the cable approaches zero. One variant to this end will include a spring which biasses the switch 10 towards its motor energizing position. In other words, the cable reel assembly is switched to its cable reel-in mode by the tension $F_2$ prevailing in the cable or more specifically by the fall-off in cable tension towards a zero tension condition. This will ensure that the length of cable withdrawn will always lie within a comfortable cable span. In accordance with one advantageous embodiment of the invention, the switch 10 may be constructed to connect the current supply to the motor 2 when the cable is disconnected from the external power supply, e.g. an electric wall socket.

What I claim is:

1. In a motor-driven cable reel assembly comprising a rotatable drum for winding thereon an electric cable, an electric motor operatively connected to said drum for rotating said drum in a cable reel-in direction, a storage battery connected to said motor for supplying power thereto, a battery charger connected to said cable for recharging said battery when said cable is connected to a source of current, the improvement comprising:

said drum including a rotatable side wall;

motor control switch means, operatively connected to said motor and operable to actuate said motor to rotate said drum in said reel-in direction, during which said motor generates torque, for switching-off said motor in response to generation thereby of a predetermined said torque, said switch means being actuated by rotation of said side wall to switch on and off said motor in response to the direction of rotation of said side wall.

2. The improvement claimed in claim 1, further comprising means for manually actuating said switch means, and said switch means switching-off said motor when the torque generated thereby exceeds said predetermined torque.

3. The improvement claimed in claim 1, wherein said switch means operates to close a circuit of said motor when the torque generated thereby is below a first predetermined value and to open said circuit when the torque generated by the motor exceeds a second predetermined value.

4. The improvement claimed in claim 1, wherein said switch means comprises first and second stops on said side wall at circumferentially spaced locations, and a switch having a contact member positioned between said first and second stops to be contacted thereby upon rotation of said side wall in respective opposite directions.

5. The improvement claimed in claim 4, wherein said contact member has a predetermined selectible resistance to movement.

6. The improvement claimed in claim 4, further comprising manual means for rotating said side wall in a first direction until said first stop actuates said contact member of said switch to thereby cause said motor to rotate said drum in said cable reel-in direction, during which said cable exerts a resistance force in a direction opposite to said cable reel-in direction on said drum and thereby on said side wall, said torque generated by said motor countering said resistance force, whereby when said resistance force reaches a given level as a function of said predetermined torque said side wall is rotated in a second direction opposite to said first direction until said second stop actuates said contact member of said switch to switch-off said motor.

* * * * *